Figure 1:
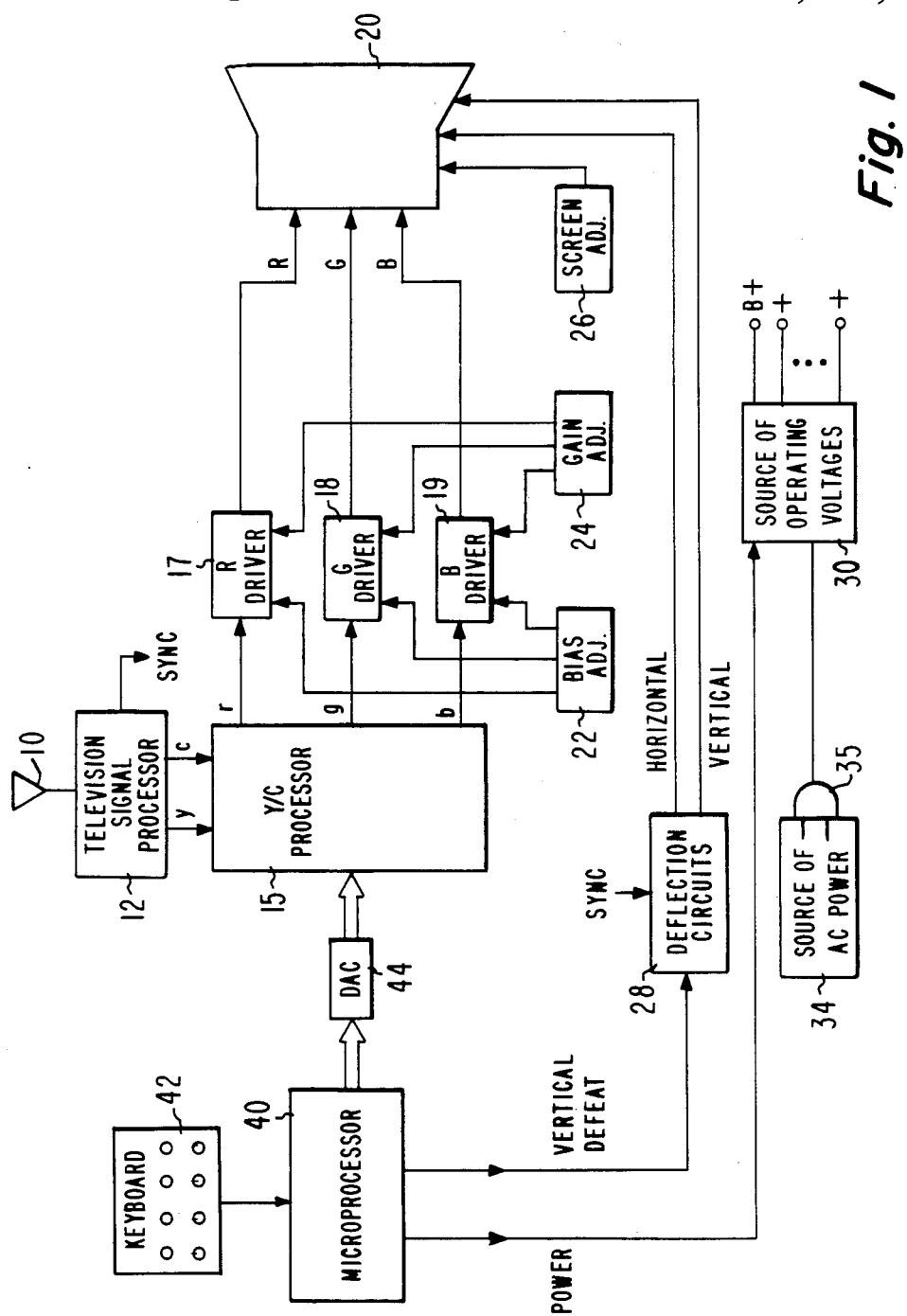

United States Patent [19]

Osborne et al.

[11] Patent Number: 4,769,703
[45] Date of Patent: Sep. 6, 1988

[54] APPARATUS FOR ALIGNING AN IMAGE DISPLAY DEVICE IN A VIDEO SIGNAL PROCESSING AND DISPLAY SYSTEM

[75] Inventors: Gary T. Osborne, Indianapolis, Ind.; Warren C. DeVilbiss, Greenfield, Wis.

[73] Assignee: RCA Licensing Corporation, Princeton, N.J.

[21] Appl. No.: 47,296

[22] Filed: May 8, 1987

[51] Int. Cl.⁴ .............................................. H04N 7/02
[52] U.S. Cl. ....................................... 358/139; 358/10
[58] Field of Search ................. 358/139, 10, 190, 903; 364/146, 188, 481, 518, 521, 571; 371/20

[56] References Cited

U.S. PATENT DOCUMENTS 3,816,653  6/1974  Bosiger .............................. 358/139
4,700,218 10/1987  Thomsen et al. ................. 358/10 X Primary Examiner—Howard W. Britton
Assistant Examiner—Victor R. Kostak
Attorney, Agent, or Firm—Paul J. Rasmussen; Peter M. Emanuel; Ronald H. Kurdyla

[57] ABSTRACT

Apparatus to permit service adjustment of a television receiver includes a microprocessor which normally controls parameters of a video signal processed by the receiver. The microprocessor also automatically establishes a desired video signal reference condition for the service mode when manual service controls are to be adjusted. The service mode is entered by pressing a designated microprocessor keyboard key while plugging the receiver into a source of primary AC power.

4 Claims, 2 Drawing Sheets

APPARATUS FOR ALIGNING AN IMAGE DISPLAY DEVICE IN A VIDEO SIGNAL PROCESSING AND DISPLAY SYSTEM

This invention concerns apparatus for facilitating the service alignment of an image display device such as a kinescope in a color television receiver, to establish proper operating parameters for the display device.

A color image reproducing kinescope included in a color television receiver comprises plural electron guns each energized by red, green and blue color image representative signals derived from a composite color television signal. Since a reproduced color image is defined by one or more color signals, optimum reproduction of a color image requires that the relative proportions of these color signals be correct at all kinescope drive levels from white through gray to black, at which point the three electron guns should exhibit significantly reduced conduction or be cut-off.

The optimum reproduction of a color picture and the gray scale characteristic of the kinescope can be adversely affected when the bias of the electron guns varies from a predetermined level, causing unwanted kinescope cut-off errors to be produced. These errors are visible as a color tint on a displayed monochrome picture, and also upset the color fidelity of a displayed color image. The cut-off errors can be caused by a variety of factors, including variations in the operating characteristics of the kinescope and associated circuits due to aging and temperature effects.

Since it is desirable to assure that the proportioning of the color signals applied to the kinescope is correct at all picture brightness levels, color television receivers usually include provisions for adjusting the kinescope and associated circuits in a set-up or service operating mode of the receiver in accordance with well known procedures. Briefly, a manual service switch with "normal" and "service" positions is operatively associated with the receiver signal processing circuits and the kinescope. In the service position, e.g., for a bias adjustment, a video signal reference condition is established and vertical image scanning of the kinescope is collapsed. The bias of each kinescope electron gun is then manually adjusted to establish a desired bias condition, e.g., black level current, for each electron gun. This adjustment ensures that the kinescope is properly blanked in the absence of an applied video signal or in response to black information content of the video signal, and also insures a proper proportion of color signals at all brightness levels. The kinescope driver circuits associated with each electron gun are then adjusted for a desired gain (e.g., to compensate for kinescope phosphor inefficiencies) to assure a proper proportion of red, green and blue signal drive when the receiver operates normally.

It is herein recognized as desirable to improve the manual service procedure and to eliminate the relatively large and costly service switch. In accordance with the principles of the present invention, this is accomplished by using a microprocessor, which is often included in many receiver designs to control various parameters of a video signal processed by the receiver, to facilitate the service procedure without incurring additional cost. The use of such microprocessor, which normally controls adjustable signal processing parameters such as signal amplitude (image contrast), signal DC level (image brightness) and signal peaking, color and tint levels, initiates and semi-automates the service alignment procedure and improves the repeatability of the service procedure. The disclosed system advantageously eliminates both the need for a service switch or equivalent jumper wire connection and the need to remove the rear cover of the receiver to perform the service alignment, and automatically provides proper signal reference values for the service procedure.

In accordance with a feature of the invention, access to the service mode by a service technician is permitted via a procedure which minimizes the risk of accidental access by a viewer. In a disclosed embodiment, the service mode is entered by pressing a dedicated service key of the microprocessor while plugging the receiver into an AC power receptacle.

Figure 2:
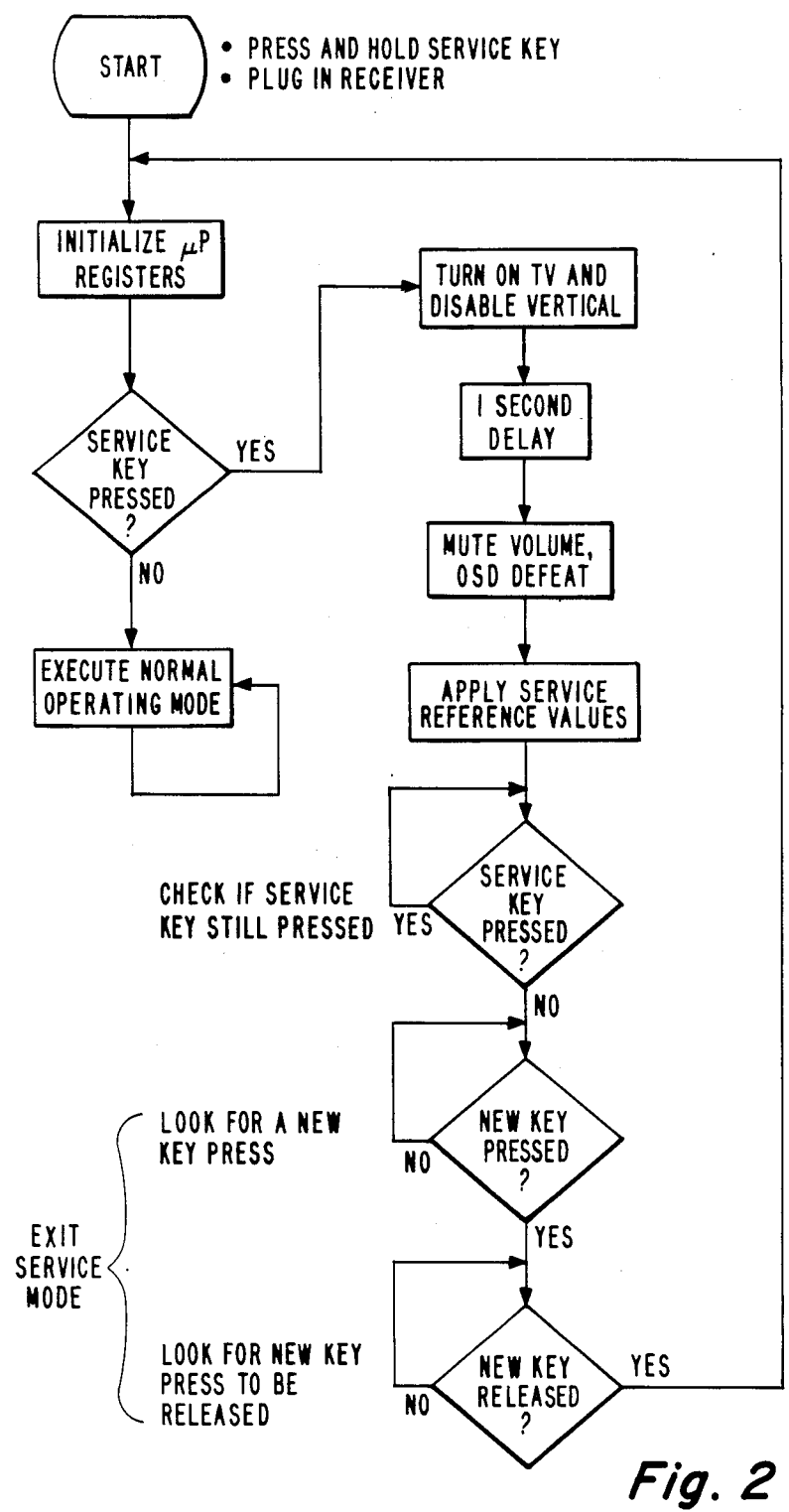

In the drawing:

FIG. 1 illustrates a portion of a color television receiver including service apparatus in accordance with the principles of the present invention; and FIG. 2 illustrates a flow chart of a receiver service procedure in accordance with the principles of the present invention.

In FIG. 1, a broadcast television signal received by an antenna 10 is coupled to a television signal processor 12 including a radio frequency tuner, intermediate frequency amplifier stages, a video detector stage and a luminance-chrominance signal separation filter, all as known. Separated luminance (Y) and chrominance (C) components of the television signal are conveyed to a luminance and chrominance signal processor 15 including gain controllable amplifiers for determining the color saturation and contrast of a displayed image, DC level setting networks for determining the brightness of a displayed image, and high frequency peaking circuits for enhancing the fine image detail of a displayed image, among other conventional circuits, all as known.

Processor 15 provides output low level color image representative signals r, g and b to respective red, green and blue display driver amplifiers 17, 18 and 19, which provide DC coupled output high level video signals R, G and B with a magnitude suitable for directly driving respective intensity control electrodes (e.g., cathode electrodes) of a color image reproducing kinescope 20. Coupled to display driver amplifiers 17, 18 and 19 are a bias adjustment network 22 and a gain adjustment network 24. Networks 22 and 24 each include plural adjustable devices, e.g., potentiometers, respectively associated with individual ones of display drivers 17, 18 and 19. The control devices associated with networks 22 and 24 are accessible from the rear of the receiver, and are adjusted by a service technician during receiver manufacture and subsequent receiver service. Network 22 is adjusted to establish proper bias for the display driver amplifiers so that gray scale image information, and black information in particular, is properly reproduced by kinescope 20. Network 24 is adjusted to establish a proper signal gain relationship among the display driver amplifiers to assure accurate reproduction of color information. An adjustable network 26 is coupled to a screen grid of kinescope 20 for adjusting the bias thereof. Horizontal and vertical deflection of a displayed image are controlled in response to horizontal and vertical deflection signals from deflection circuits 28, which respond to an image synchronizing SYNC signal derived from the television signal via processor 12.

Operating voltages for the receiver are supplied by a source 30. The operating voltages are developed when voltage supplies within source 30 are connected to a source of primary AC power 34 (i.e., household AC power) via a power plug 35 in response to a POWER control signal from a microprocessor 40. The control signal is developed when a viewer presses a receiver power ON-OFF key of a keyboard 42 associated with microprocessor 40. The receiver is de-energized when the power key is released by pressing it again, for example.

The receiver also includes a digital-to-analog converter (DAC) 44 which converts binary signals from microprocessor 40 to analog form. Microprocessor 40 provides information for controlling various parameters of the video signal processed by processor 15. In this respect microprocessor 40 receives viewer generated control signals related to a desired condition of image brightness or contrast, for example, via keyboard 42. Keyboard 42 includes a plurality of pushbuttons, or keys, for controlling various receiver functions such as increasing or decreasing contrast, brightness, peaking, volume and channel changing, for example. Keyboard 42 may be an infrared remote unit, or a unit attached to a front panel of the receiver. The control signals from keyboard 42 exhibit binary form which, after processing by microprocessor 40, are converted to analog form by DAC 44 before being coupled to respective control inputs of luminance-chrominance processor 15. The use of microprocessor 40 in combination with keyboard 42 to electronically implement the described functions, among others, is well known and represents an efficient, economical alternative to the use of relatively large and costly electromechanical control devices such as potentiometers.

It is herein recognized that microprocessor 40 offers an attractive alternative to a mechanical "service switch" which is used in many receivers to facilitate service adjustment of the receiver, i.e., when networks 22, 24 and 26 are to be adjusted. In this regard, in the service mode microprocessor 40 advantageously provides the required control signals to defeat normal video information and to provide an appropriate video signal reference condition such as a black reference level when a black level related kinescope bias adjustment is to be made, for example.

Microprocessor 40 includes a nonvolatile memory, such as an EEPROM (electronically erasable programmable read only memory) which stores reference values associated with certain signal processing functions. With such a memory unit the reference values remain stored even when the receiver is not connected to the AC power source. Such stored values may be factory preset values for image contrast, brightness, peaking and tint levels which can be recalled by a single keystroke to provide a nominally acceptable image without the need for the viewer to adjust separate controls individually. The memory element of microprocessor 40 also stores service reference values which may be related to the factory preset values, although this need not be the case. The stored reference values establish reference conditions for certain video signal parameters as required for a proper service alignment of the receiver, as will be explained.

The receiver is unplugged from power source 34 before the service mode is entered. The service mode is entered by pressing and holding a designated "service" key of keyboard 42 while plugging power plug 35 into AC power source 34. This procedure minimizes the possibility of accidental access to the service mode by a viewer, since it is very unlikely that a viewer will press a keyboard key while plugging the receiver into the AC power receptacle.

The following example of receiver operation in the service mode refers to the procedures for adjusting the kinescope bias to produce a desired black image level, and is given with respect to FIG. 2. FIG. 2 shows a flow chart for the operation of the receiver in the normal and service modes.

When receiver service adjustments are to be made, at the START point the receiver is unplugged from AC power source 34, the service key is pressed and held, and the receiver is plugged into power source 34, in the stated sequence. The service key is held in for at least one second after the receiver is plugged in, during which time certain memory registers and timing circuits in microprocessor 40 are automatically set to initial values. The service key is then released. In this system the keys of keyboard 42 are pushbutton switches of the momentary contact type which are engaged only when pressed.

If the service key is sensed as not being pressed, microprocessor 40 permits the receiver to enter a normal operating mode wherein receiver signal processing circuits are enabled for normal viewing of broadcast video information. The normal operating mode involves a closed loop such that the system does not return to the previous initialization and service key sensing procedure unless power plug 35 is disconnected and re-connected. Thus accidentally pressing the service key when the receiver is in the normal operating mode will not place the receiver in the service mode. The service mode is entered only if the service key is sensed as being pressed during plug-in of the receiver.

When the service mode has been entered, the receiver is turned on as it would be for normal viewing purposes (i.e., the various signal processing circuits are energized as they would be normally), but a VERTICAL DEFEAT signal from microprocessor 40 disables vertical deflection scanning of kinescope 20. A one-second delay is provided to allow certain system elements and parameters to stabilize. The auxiliary on-screen display (OSD) function is defeated, and volume is muted for the convenience of the service technician. Afterwards, prescribed service reference values are applied to the video signal processing circuits to establish a desired service condition. In the case of a black level bias service adjustment, video signal information is defeated by applying preselected reference values to brightness, contrast and color control circuits to produce a desired uniformly black, blanked image display. A brightness reference value establishes a black reference DC level, and contrast and color control reference values assure that the amplitudes of the luminance and chrominance components of the video signal are highly attenuated so as to have substantially no effect on the DC bias adjustments. In some systems it may be preferable to switchably disconnect the video signal to assure that the video signal has no effect on the DC bias adjustments.

The image display field is collapsed to a narrow horizontal line in the center of the display screen of kinescope 20 due to the defeated vertical scanning of the display. Since the luminance and chrominance channels are rendered inoperative to coupled luminance and chrominance components to kinescope 20, display driver amplifiers 17, 18 and 19 provide quiescent DC voltages to respective cathode electrodes of kinescope 20 approximately equal to those provided by a lack of luminance and chrominance signals.

After the service reference values have been applied, microprocessor 40 checks to determine if the service key remains pressed or has been released. The service key will be released by the service technician when the service adjustments are to be made. Release of the service key, as sensed by microprocessor 40, enables the service mode to be exited after the service adjustments have been made, as will be discussed.

Color temperature bias adjustments of kinescope 20 are accomplished manually by adjusting the fixed bias voltages applied to the electron gun assembly of kinescope 20 from adjustable screen grid bias control network 26 and from the adjustable devices of bias control network 22. In the case of the latter adjustment via network 22, the bias adjustment of each display driver produces a bias change at the output of each DC coupled display driver amplifier, which in turn alters the cathode bias of kinescope 20. The bias is adjusted until the dim horizontal service line is barely visible, at the point of extinction, indicating that the electron guns of kinescope 20 are properly biased on the threshold between conduction and cut-off.

After the service procedures have been completed, the service mode is exited by pressing and releasing a new key. The new key may be a designated service release key, or any arbitrarily chosen key. After exiting the service mode the system returns to the initialization point and to the normal operating mode.

What is claimed is:

1. In a system for processing an image representative video signal, said system subject to exhibiting normal and service operating modes and including a video signal channel for processing said video signal, an image display device responsive to a processed video signal from said video channel, and deflection means associated with said image device for providing horizontal and vertical scanning of said image display device; semiautomatic service adjustment apparatus comprising:
   manual control means for adjusting an operating parameter of said system in said service operating mode; and
   automatic control means coupled to said video signal channel for automatically causing said video signal channel to establish a desired video signal reference condition in said service mode to facilitate service adjustment of said system by said manual control means; wherein
   said automatic control means is a microprocessor otherwise included in said system for controlling parameters of said video signal processed by said video signal channel in said normal operating mode.

2. In a system for processing an image representative video signal, said system subject to exhibiting normal and service operating modes and including a video signal channel for processing said video signal, an image display device responsive to a processed video signal from said video channel, and deflection means associated with said image device for providing horizontal and vertical scanning of said image display device; semiautomatic service adjustment apparatus comprising:
   manual control means for adjusting an operating parameter of said system in said service operating mode; and
   automatic control means coupled to said video signal channel for automatically causing said video signal channel to establish a desired video signal reference condition in said service mode to facilitate service adjustment of said system by said manual control means; wherein
   said automatic control means is a microprocessor otherwise included in said system for controlling parameters of said video signal processed by said video signal channel in said normal operating mode;
   said operating parameter is a bias for said image display device; and
   said microprocessor in said service mode causes a video signal processed by said video signal channel to exhibit an amplitude and DC level for establishing a black reference image display condition, and defeats said vertical scanning of said image display device.

3. Apparatus according to claim 1, wherein
   said manual control means includes a variable impedance device coupled to said image display device.

4. A method for aligning a television receiver energized from a primary power source and including a video signal channel for processing a video signal; an image display device responsive to a processed video signal from said video channel; adjustable manual control means for adjusting an operating parameter of said receiver in a service mode, and automatic control means, responsive to the setting of associated control keys, coupled to said video signal channel for automatically causing said video signal channel to establish a desired video signal reference condition in said service mode to facilitate service alignment of said receiver, said method comprising the sequential steps of:
   entering said service mode by
   (a) disconnecting said receiver from said primary power source;
   (b) engaging a service key associated with said automatic control means;
   (c) connecting said receiver to said primary power source; and
   (d) releasing said service key; and adjusting said manual control means to establish a desired condition of said operating parameter.

* * * * *